I. KITSEE.
OPERATING DIRECT CURRENT MOTORS.
APPLICATION FILED MAR. 21, 1919.
1,405,041.
Patented Jan. 31, 1922.
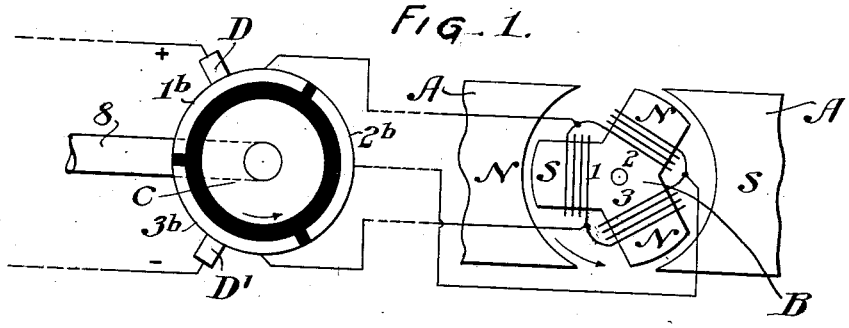
FIG. 1.
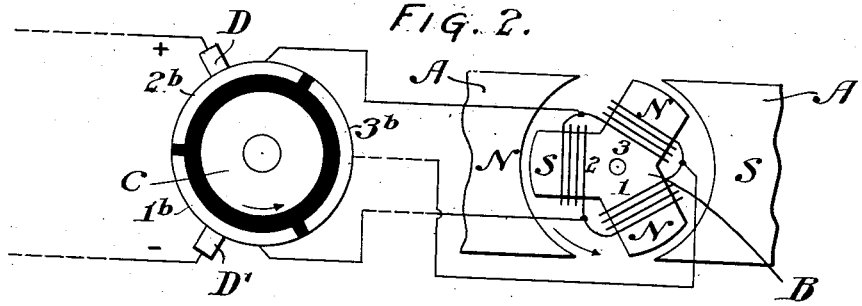
FIG. 2.
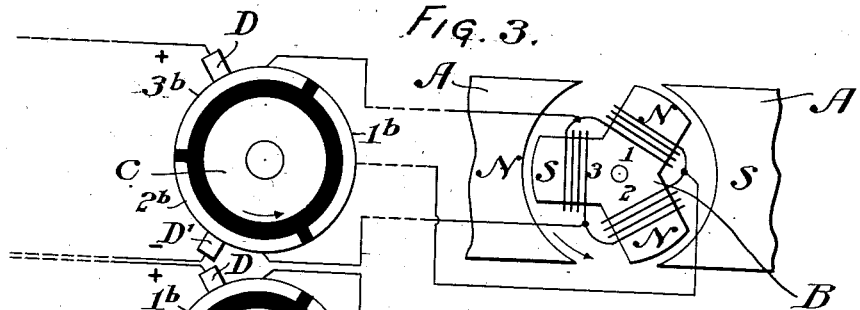
FIG. 3.
FIG. 4.

UNITED STATES PATENT OFFICE.

ISIDOR KITSEE, OF PHILADELPHIA, PENNSYLVANIA.

OPERATING DIRECT-CURRENT MOTORS.

1,405,041.      Specification of Letters Patent.      Patented Jan. 31, 1922.

Application filed March 21, 1919. Serial No. 283,999.

*To all whom it may concern:*

Be it known that I, ISIDOR KITSEE, a citizen of the United States, residing at Philadelphia, in the county of Philadelphia and State of Pennsylvania, have invented certain new and useful Improvements in Operating Direct-Current Motors, of which the following is a specification.

My invention relates to an improvement in the operation of direct current motors.

In some cases it is required that an electric drive should be operated at predetermined speeds and should start or stop at predetermined points, and the purpose of my invention is to produce an electric motor adapted to perform such functions.

To illustrate one form my invention may take I have reference to the accompanying drawing, in which Figs. 1, 2, 3, and 4 are diagrammatic views illustrating the different positions of the armature at different steps or points of its revolution.

In these figures, A are the field poles and B the armature as an entirety. Of this armature 1, 2, and 3 are the respective poles. S indicates the south and N the north pole; C indicates the commutator as an entirety. Of this commutator, $1^b$, $2^b$, $3^b$, are three conducting segments and D, D', are the two brushes. The arrows indicate the direction in which the commutators revolve, 8 indicates a shaft with the aid of which the commutator may be rotated with any suitable means, electrical or otherwise.

It is assumed at the beginning of the operation the armature B is in a position as indicated in Fig. 1. In this figure the pole 1 has a south polarity and is opposite the north field pole A. Of the remaining two poles 2 and 3, each has a north polarity and they are both opposite the south field pole A.

To produce the first step, that is, one-third the revolution, it is required that the armature pole 1 should change its polarity from south to north and pole 2 from north to south, the pole 3 remaining with the former polarity, that is, north. This will bring the armature in the position as indicated in Fig. 2, wherein the pole 2 is now opposite the field pole N and the remaining poles are opposite the field pole S.

To make a second step, that is, the second third of the revolution, the armature poles have again to be changed in the following manner:—The pole 2, which was formerly S has now to be N and the pole 3 which was formerly N has now to be S: the pole 1 remains at the same polarity, that is, N. To produce now the third step, that is, to complete the entire revolution, the change in polarity has to be such that the armature pole 3 formerly S now becomes N and the pole 1, formerly N now becomes S; the pole 2 retaining its former polarity, that is N.

The polarity of the armature pole pieces in Fig. 4 therefore is exactly the same as indicated in Fig. 1. It is therefore to be seen that for each revolution the armature has to make three steps, and for each step a change in the polarity of two of its poles has to take place. And it is also apparent that this change takes place in the two poles having opposite polarity, leaving one pole for each alternate step of the same polarity.

From the different positions of the armature as illustrated, the following can be deduced:—First, of the three armature poles two poles must always be of the same polarity, the third pole having an opposite polarity. Second, for each step one of the two poles with a like polarity and the pole of opposite polarity has to be changed, leaving the polarity of the third pole unchanged.

For the purpose of my invention it is immaterial if the change in polarity takes place automatically or with the help of revolving commutators or by manually operated switches or in any desired and practical manner. But it has to be borne in mind that under all conditions the motor as here illustrated and described is operated by a source of direct current.

Having now described my invention, what I claim as new and desire to secure by Letters Patent is:—

The method of producing step by step rotation in a direct current motor provided with a three part armature, which consists in constantly exciting the field and armature coils of said motor so that a partial or full torque is maintained at all times, causing predetermined rotation of said armature by reversing the polarity of two parts of the armature while the polarity of the third part remains the same.

In testimony whereof I affix my signature in the presence of two witnesses.

ISIDOR KITSEE.

Witnesses:
    E. E. MILLER,
    JOHN J. RUTHERFORD.